Inventors:
Archibald N. Wright;
Wilfred F. Mathewson, Jr.,
by Paul R. Webb, II
Their Attorney.

United States Patent Office 3,518,111
Patented June 30, 1970

3,518,111
PHOTOPOLYMERIZED FILM, COATING AND PRODUCT, AND METHOD OF FORMING
Archibald Nelson Wright, Schenectady, N.Y., and Wilfred F. Mathewson, Jr., Franklin, Mich., assignors to General Electric Company, a corporation of New York
Filed Dec. 1, 1966, Ser. No. 598,364
Int. Cl. B01j 1/10; C08f 1/18
U.S. Cl. 117—93.31                                                10 Claims

ABSTRACT OF THE DISCLOSURE

A thin, continuous film is formed on a substrate by ultraviolet surface photopolymerization of a material in the gaseous phase. The material is selected from various substituted saturated aliphatic hydrocarbons in which hydroxyl, halo, or amino groups have been substituted or from aromatic hydrocarbons in which hydroxyl, halo, amino, alkyl, or mixed hydroxyl and alkyl groups have been substituted. Such films are useful as coating on metallic and non-metallic substrates, capacitor dielectrics, cryogenic device insulation, insulation for microelectric devices, primer or insulation on electrically conductive wire, and for corrosion protection.

---

Figure 1:
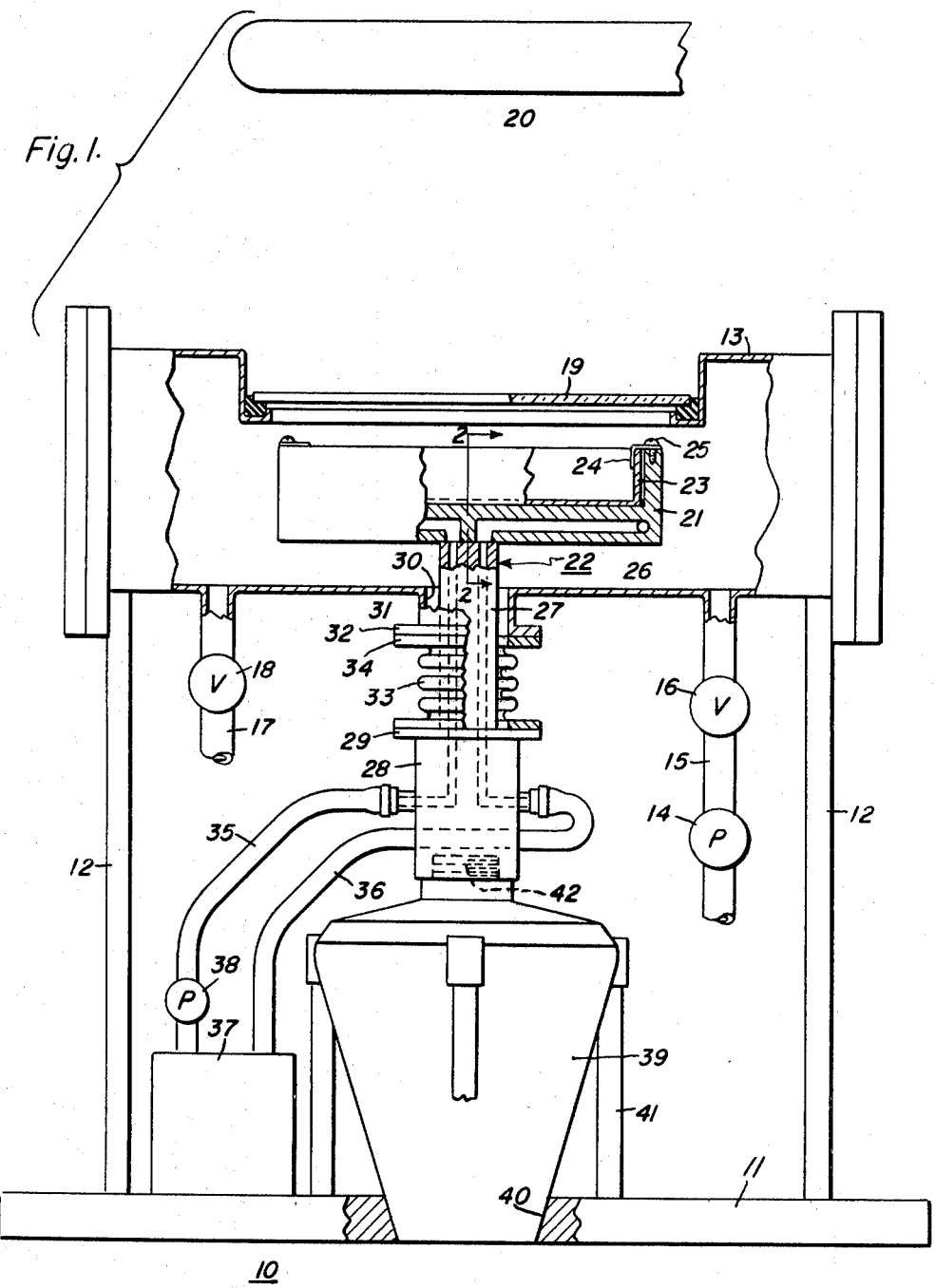

This invention relates to photopolymerized films, coatings, and products including such films or coatings, and to methods of forming such films, coatings, and products, and more particularly to continuous films, coatings, and products formed by ultraviolet surface photopolymerization of material in the gaseous phase and to methods of forming such films, coatings and products.

Thin films, which can be configuratively deposited are desirable for a wide variety of applications. It is further desirable that such thin films and coatings be adhesive to a substrate, and continuous thereon. The present invention is directed to improved thin films, coatings and products having such films or coatings thereon which exhibit the above desirable characteristics and to methods of forming such films, coatings, and products having such films or coatings. Such thin films and coatings are formed by ultraviolet surface photopolymerization of a material in the gaseous phase, which material is selected from various substituted saturated aliphatic hydrocarbons or aromatic hydrocarbons. For example, hydroxyl, halo and amino groups can be substituted in the saturated aliphatic hydrocarbons to provide the respective alcohols, halides, and amines. Similarly, hydroxyl, halo, amino, alkyl, and mixed hydroxyl and alkyl groups can be substituted in the aromatic hydrocarbons to provide various compounds including phenol, halobenzenes, aniline, toluene, and 2,6-xylenol.

In addition to being configuratively deposited, continuous and adhesive, the films and coatings formed in accordance with our invention exhibit good chemical resistance, have high dielectric strength, have high dielectric constants, are imperforate, and exhibit good temperature stability. These films and coatings are useful for a wide variety of applications including covering layers for various metallic and non-metallic substrates, capacitor dielectrics, cryogenic device insulation, insulation for microelectric devices, as a primer or as insulation on electrically conductive wire, and for corrosion protection. Films and coatings formed in accordance with our invention are also useful on diamonds, on cubic boron nitride (known as borazon) which is disclosed and claimed in U.S. Pat. 2,947,617, and in abrasive wheels using such coated diamonds or borazon imbedded in an organic matrix.

In the copending application of Archibald N. Wright, Ser. No. 530,971, filed Mar. 1, 1966, and assigned to the same assignee as the present application, there are disclosed and claimed films, coatings, and products including such films or coatings formed by ultraviolet surface photopolymerization selected from the group consisting of hexachlorobutadiene, tetrafluoroethylene, trifluoromonochloroethylene, monofluorotrichloroethylene, hexafluorobutadiene, acrylonitrile, and mixtures thereof.

It is an object of our invention to provide a method of forming a continuous film by ultraviolet surface photopolymerization of a material in the gaseous phase, which material is selected from various substituted saturated aliphatic hydrocarbons or aromatic hydrocarbons.

It is another object of our invention to provide such a method in which hydroxyl groups are substituted in the saturated aliphatic hydrocarbons, and hydroxyl groups, hydroxyl and alkyl groups, and alkyl groups are substituted in the aromatic hydrocarbons.

It is another object of our invention to provide a method of forming a continuous film in a predetermined pattern on a substrate by ultraviolet photopolymerization of such a material in the gaseous phase thereby forming a product or composite article.

It is another object of our invention to provide a method of forming a continuous coating on a substrate by ultraviolet surface photopolymerization of such a material in the gaseous phase and removing subsequently the substrate by chemical etching.

It is a further object of our invention to provide a product having a substrate with a continuous film adhering to at least one surface thereof, which film is produced by ultraviolet surface photopolymerization of such a material in the gaseous phase.

In accordance with our invention, a continuous film can be formed by ultraviolet surface photopolymerization of a material in the gaseous phase, which material is selected from the class consisting of hydroxyl substituted saturated aliphatic hydrocarbons, hydroxyl substituted aromatic hydrocarbons, hydroxyl and alkyl substituted aromatic hydrocarbons, and alkyl substituted aromatic hydrocarbons.

Figure 2:
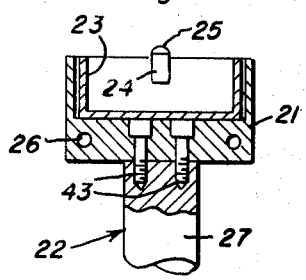
Figure 3:
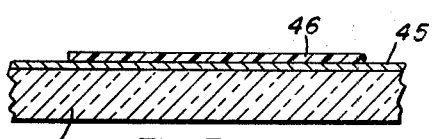

These and various other objects, features and advantages of the invention will be better understood from the following description taken in connection with the accompanying drawing in which:

FIG. 1 is a side elevational view partially in section of an apparatus for forming films, coatings and products in accordance with our invention; and FIG. 2 is a sectional view of a portion of the apparatus taken on line 1—1 of FIG. 1; and FIG. 3 is a sectional view of a substrate with a continuous film thereon formed in accordance with our invention.

In FIG. 1 of the drawing, an apparatus is shown generally at 10 for forming films, coatings and products having such films or coatings thereon in accordance with our invention. A base 11 is provided on which is mounted a pair of support members 12. An enclosure 13 is positioned upon support members 12. A vacuum pump 14 is connected by a line 15 to enclosure 13 to evacuate the latter. A control valve 16 is provided in evacuation line 15. An inlet line 17 is connected at one end to enclosure 13 and at its other end to a source (not shown) of material to be supplied in gaseous form to enclosure 13. A control valve 18 is provided in line 17 to control the supply of material to enclosure 13. An ultraviolet light transmitting window 19 is shown positioned in the upper wall portion of enclosure 13 and is removed therefrom.

An ultraviolet light 20, which is normally provided with a reflector (not shown), is shown outside and spaced above enclosure 13 in alignment with window 19.

Light 20 is supported in any suitable manner. Such a light source provides ultraviolet light in the region of about 2,000 to 3,500 angstroms, which is directed by the reflector (not shown) through window 19 into enclosure 13. A metal hood (not shown) is also positioned around the enclosure and light source. A substrate support member 21 is positioned within enclosure 13 and connected to the driven end of a driver shaft 22. A tray or container 23 is located within the upper recessed portion of member 21 to provide a container for material to be used during the operation of apparatus 10. Brackets 24 are shown at opposite ends of tray 23, which brackets are fastened by means of screws 25 to support member 21. A cooling tube 26 is imbedded in substrate support member 21 to provide cooling for the member, associated tray 23 and material placed in tray 23.

Since apparatus 10 is useful for coating diamonds, borazon and other particle material, there is provided a driver shaft 22 which has an upper drive portion 27 and a lower driven portion 28. Driver portion 27 of shaft 22 has a smaller diameter than driven portion 28. Shaft 22 is shown with a flange 29 at the junction of portions 27 and 28. Driven portion 27 of shaft 22 extends through an aperture 30 in the wall of enclosure 13. A closure 31 with an associated flange 32 extends outwardly from and surrounds aperture 30. A diaphragm 33 with a flange 34 at each end is connected by means of these flanges to associated flange 32 of closure 31 and to flange 29 on driver shaft 22. In this manner, a vacuum can be maintained in enclosure 13 while shaft 22 can be vibrated. Tube 26 within substrate support member 21 continues through the interior of shaft 22 and is connected to an inlet tube 35 and an outlet tube 36. Tubes 35 and 36 are connected to a cooling unit 37 which is shown positioned outside enclosure 13 and supported on base 31. Unit 37 consists of, for example, a Dewar flask in which is positioned a coil connected to the ends of tubes 35 and 36, and which is filled with ice. A thermometer (not shown) is positioned in the ice to record the temperature within unit 37. Other cooling units, such as a heat exchanger or a refrigeration device, can also be employed. A circulating pump 38 is connected to inlet tube 35 to circulate a coolant through tube 35, tube 26 and outlet tube 36. A wide variety of coolants might be employed, for example, water or ethanol.

A vibratory device 39 is shown positioned in a recess 40 in base 11. A plurality of support members 41 are attached to base 11 and to device 39 to position the device. The upper end of device 39 fits into a recess 42 in the end of a driven portion 28 of shaft 22. For example, a multi-impedance driver unit might be employed for device 39.

In FIG. 2 of the drawing, there is shown a sectional view of a portion of apparatus 10 taken on line 1—1 of FIG. 1. In FIG. 2 the end of driver portion 27 of shaft 22 is shown connected to substrate support member 21 by means of a pair of threaded fasteners 43. In this manner the drive end 27 of shaft 22 is connected to substrate support member 21 and positions this member within enclosure 13.

In FIG. 3 of the drawing, there is shown a glass substrate support 44 with a 0.25 micron thick aluminum film substrate 45 thereon. A continuous film 46 is shown adhering firmly to the upper surface of the aluminum film 45 in accordance with the method of our invention using the apparatus shown in FIG. 1.

We have discovered unexpectedly that a continuous, imperforate film could be formed which comprises photopolymerizing a material in the gaseous phase, which material is selected from the group consisting of hydroxyl substituted saturated aliphatic hydrocarbons, hydroxyl substituted aromatic hydrocarbons, hydroxyl and alkyl substituted aromatic hydrocarbons, and alkyl substituted aromatic hydrocarbons on the surface of a substrate member with ultraviolet light having an effective wave length preferably in the range of 2,000 angstroms to 3,500 angstroms at a vapor pressure for the material in the gaseous phase in the range of from 0.1 to 4.0 mm. of mercury. We have found further that subsequent to the formation of the above type of continuous film formed on the substrate, the substrate could be removed, for instance, by chemical etching with hydrochloric acid or hydrofluoric acid, thereby providing an unsupported body of the film.

When the continuous, imperforate film is formed from a hydroxyl substituted saturated aliphatic hydrocarbon, such as ethanol, chemical reactivity appears to involve the hydroxyl group. However, when such a film is formed from a hydroxyl substituted aromatic hydrocarbon, such as phenol, infra-red measurements show almost complete retention of the hydroxyl and phenyl groups, although aliphatic CH group are present to a slight extent. The hydroxyl group perturbs the benzene ring so that it is subject to ultraviolet surface-activation, although reaction does not appear to occur at this point in the phenol molecule. Polymerization yields a polyphenol-like structure.

In an illustrative operation of the apparatus shown in FIG. 1 of the drawing, tray 23 is filled with a monolayer of diamond particles, which tray had been affixed previously to substrate support block 21. Window 19 is then positioned in the upper wall of enclosure 13. Vacuum pump 24 is started and pumped down the chamber defined by enclosure 13 to a pressure of about one micron. Valve 16 is then closed. A material, which is photopolymerizable in its gaseous state, is supplied from a solid source (not shown), such as phenol, which is positioned in an area which will be shaded in enclosure 13.

The monomer, phenol, is heated to about 100° C., to provide a vapor pressure of about 100 microns. Ultraviolet lamp 20 is shown positioned outside and in alignment with window 19 and substrate support member 21. However, lamp 20 can be positioned inside enclosure 13. The lamp, which has an effective wave length in the range of 2,000 to 3,500 angstroms, is turned on whereby the temperature of the substrate support member 21 increases and the vapor pressure rises. A metal hood (not shown) is positioned around apparatus 10 since this particular light source is used.

Vibratory device 39 is turned on, whereupon shaft 22 is vibrated. Substrate support member 21, which is connected to the driven end of shaft 22, is vibrated by shaft 22, which vibration causes the diamond particles in tray 23 to move in a random fashion. In this manner, a larger surface area of the particles is exposed to both the monomer and the light source during the operation of the apparatus.

After a period of time, lamp 20 is shut off, vibratory device 39 is turned off, and the system is pumped down to about 10 microns pressure to remove all by-products. The metal hood is removed and the vacuum is broken. Enclosure 13 is cooled to room temperature and, subsequently, window 19 is removed. Tray 23 is removed from substrate support member 21 and the diamond particles in the tray are examined. The particles have a color as opposed to the gray color of the initial, uncoated diamonds. Upon further examination under a microscope these diamond particles show an adherent, thin, continuous, imperforate film formed on at least a portion of the faces of the diamond particles. Such films are useful for bonding the diamonds to phenolic wheel matrices.

In a second illustrative operation of the apparatus shown in FIG. 1 of the drawing, a substrate support in the form of a 1 inch x 3 inch glass microscope slide with a 0.25 micron thick aluminum film substrate thereon was positioned on support block 21. A stainless steel light mask of dimensions 1 inch x 3 inches with three slots therein was placed on the upper surface of the aluminum film substrate thereby covering the film substrate except for the slots.

Window 19 is then positioned in the upper wall of enclosure 13. Vacuum pump 24 is started and pumped down the chamber defined by enclosure 13 to a pressure of about one micron. Valve 16 is then closed. A material, which is photopolymerizable in its gaseous state, is supplied from a solid source (not shown), such as phenol, which is positioned in an area which will be shaded in enclosure 13.

The monomer, phenol, is heated to about 100° C., to provide a vapor pressure of about 100 microns. Ultraviolet lamp 20 is positioned outside and in alignment with window 19 and substrate support member 21. The lamp is turned on whereby the temperature of the substrate support member 21 increases and the vapor pressure rises. A metal hood (not shown) is positioned around apparatus 10 since this particular light source is used.

Pump 38 is turned on and a coolant, such as ethanol, is circulated through inlet tube 35, tube 26, and outlet tube 36, thereby cooling substrate support member 21, the substrate support and its associated aluminum film substrates.

After a period of time, lamp 20 is shut off, and the system is pumped down to about 10 microns pressure to remove all by-products. The metal hood is removed and the vacuum is broken. Enclosure 13 is cooled to room temperature and, subsequently, window 19 is removed. The light mask is lifted off the aluminum film substrate and the substrate support member removed from substrate support member 21. Examination showed an adherent, thin, continuous, imperforate film had been formed on the areas of the aluminum film substrate which were in registry with the three openings in the light mask.

While it is stated in the above operation of the apparatus of FIG. 1 that an aluminum film substrate was employed for the formation thereon of a continuous film formed from the material in the gaseous phase, many other metallic and non-metallic substrates in various forms and configurations can be employed in the process. For example, such a film is formed on metallic substrates including lead, niobium, copper, gold, steel, iron, brass, and aluminum. Various non-metallic materials can be employed such as glass, quartz, mica, and carbon.

Examples of films, coatings and products including such films and coatings embodying our invention and methods of making such films and coatings and products including such films and coatings in accordance with our invention are set forth below:

EXAMPLE I

Apparatus was set up in accordance with FIGURE 1 of the drawing. A substrate support, a microscope glass slide 1 inch x 3 inches, which was provided with a 0.25 micron thick aluminum film substrate thereon, was positioned on the support block in the enclosure. A stainless steel light mask 1 inch x 3 inches and having three slots therein was placed on the surface of the aluminum substrate. Solid phenol was placed on the support block in an area to be shaded from the light source. An ultraviolet light source, in the form of an Hanovia 700 watt lamp with a reflector was positioned within the enclosure and above the upper surface of the aluminum film substrate. The window was then positioned in the upper wall of the enclosure. The system was pumped down to a pressure of one micron and the control valve was closed. A metal hood was positioned around the apparatus. The lamp, which had an effect wave length in the range from 2,000 to 3,500 angstroms, was turned on. The phenol was heated to about 100° C., to provide a vapor pressure of 100 microns. During photopolymerization, which was continued for 30 minutes under the light source, the monomer pressure rose to about 1 torr. In this operation, a film was formed on the aluminum film substrate by ultraviolet surface photopolymerization of phenol in the gaseous phase.

While it is not shown in the drawing, a plurality of thermocouples was provided to measure the temperature of the substrate and of the surface of the evaporated aluminum film to provide temperature information. Cooling means for the substrate support member, which are shown in FIG. 1 of the drawing and described above, were not employed in this example, whereby an average temperature of 290° C. was obtained from substrate and aluminum film measurements. The process was concluded by turning off the ultraviolet lamp, opening the pump control valve, and pumping down the interior of the enclosure to a pressure of about 10 microns to remove gaseous material and any by-products therefrom. The vacuum was then broken and the window was removed. The light mask was removed and the aluminum film on the glass substrate was examined. Visual examination disclosed three separate thin films, each of which was continuous. The film was measured by capacitance and interferrometric techniques and found to have an average thickness of 790 angstroms. Thus, the growth rate was about 26 angstroms per minute.

Thus a product was obtained from this example which comprised a glass base with an aluminum film substrate thereon, on which a continuous, thin, imperforate film adhered to the upper surface of the substrate.

EXAMPLE II

In the following example, the same apparatus, substrate and procedures were followed as in Example I. However, benzene, an aromatic hydrocarbon, was employed as the monomer as opposed to a hydroxyl derivative of such an aromatic hydrocarbon. After 30 minutes of ultraviolet surface irradiation during which the substrate temperature was controlled at a maximum temperature of 260° C., the aluminum film substrate was examined. There was no detectable film.

EXAMPLE III

In this example, the same apparatus, substrate, material and procedures were followed as in Example I. However, with sample No. 1, the lamp was positioned inside the enclosure while with samples No. 2–5 the lamp was positioned outside the enclosure. The following table sets forth the sample number, the monomer employed, the time of film formation in minutes, the average temperature of the cooled substrate in degrees centigrade, the average film thickness in angstroms, and the growth rate of the film in angstroms per minute. The breakdown strength of each of the five samples is 1 to $2 \times 10^6$ volts per centimeter. Sample No. 4 showed a very low dissipation factor of 0.5 percent.

| Sample No. | Monomer | Time (min.) | Average substrate temp., ° C. |
|---|---|---|---|
| 1 | Phenol | 30 | 200 |
| 2 | Ethyl alcohol | 240 | 80 |
| 3 | Cyclohexanol | 150 | 80 |
| 4 | 2,6 xylenol | 19 | 55 |
| 5 | Toluene | 12 | ~75 |

| Sample No. | Average film thickness A. | Growth rate, A./minute |
|---|---|---|
| 1 | 3,300 | ~110 |
| 2 | 240 | 1 |
| 3 | 4,000 | ~27 |
| 4 | 900 | ~48 |
| 5 | 530 | ~45 |

EXAMPLE IV

Apparatus was again set up in accordance with FIG. 1 of the drawing. Three grams of 80/100 mesh diamond particles were spread on an aluminum tray about six inches long and one inch wide. The tray was placed in the upper recessed portion of the substrate support member. An ultraviolet light source, in the form of an Hanovia 700 watt lamp with a reflector, was positioned inside the enclosure and in alignment with the substrate support member. The window was then positioned in the upper wall of the enclosure. The system was pumped down to a pressure of five microns of mercury and the control valve was closed. Solid phenol was positioned in an area which would be shaded subsequently. A metal hood was positioned around the apparatus. The lamp was turned on thereby raising the temperature of the phenol to about 100° C., to provide a vapor pressure of about 100 microns.

The circulating pump was started and flows ethanol through the substrate support member. The vibratory device was activated thereby vibrating the diamond particles in the tray. The cooling unit reduced the temperature of the substrate member, tray and diamond particles caused by the heat from the light source, to a substrate temperature of about 102° C., resulting in a substantial rate increase in the film formation and a shortening of the time involved. After 30 minutes, the process is concluded by turning off the ultraviolet light source and the vibratory device, stopping the circulating pump, removing the hood, opening the vacuum pump control valve, and pumping down the interior of the enclosure to a pressure of about one micron of mercury to remove gaseous material and any by-products therefrom. The vacuum is then broken and the window is removed from the enclosure. The tray with diamond particles is lifted up from the substrate support member. Visual examination disclosed an adherent film on at least a portion of the faces of the diamond particles.

While other modifications of the invention and variations thereof which may be employed within the scope of the invention have not been described, the invention is intended to include such as may be embraced within the following claims.

What we claim as new and desire to secure by Letters Patent of the United States is:

1. A method of forming a continuous film which comprises ultraviolet surface photopolymerization of a material in the gaseous phase, which material is selected from the class consisting of hydroxyl substituted saturated aliphatic hydrocarbons, hydroxyl substituted aromatic hydrocarbons, hydroxyl and alkyl substituted aromatic hydrocarbons, and alkyl substituted aromatic hydrocarbons.

2. A method as in claim 1, in which the photopolymerization employs an ultraviolet light having an effective wave length in the range of 2,000 angstroms to 3,500 angstroms, and the vapor pressure for the gaseous material is in the range of 0.1 to 4.0 millimeters of mercury.

3. The method as in claim 1, in which the material in gaseous phase is phenol.

4. The method as in claim 1, in which the material in gaseous phase is ethyl alcohol.

5. The method as in claim 1, in which the material in gaseous phase is cyclohexanol.

6. The method as in claim 1, in which the material in gaseous phase is 2,6 xylenol.

7. The method as in claim 1, in which the material in gaseous phase is toluene.

8. The method as in claim 1, in which there is provided an enclosure, a substrate is positioned within the enclosure, the enclosure is evacuated, the gaseous material is introduced into the enclosure, a vapor pressure is maintained for the material in the gaseous phase in the range of 0.1 to 4.0 millimeters of mercury, the material in the gaseous phase is photopolymerized on the surface of the substrate with ultraviolet light having an effective wave length in the range of 2,000 angstroms to 3,500 angstroms.

9. The method as in claim 8, in which the substrate member is cooled during photopolymerization thereby increasing the rate of film formation.

10. A thin, continuous, imperforate, adhesive film having a thickness of from about 450 angstroms to about 20,000 angstroms made in accordance with the method of claim 1.

References Cited

UNITED STATES PATENTS

| | | | |
|---|---|---|---|
| 2,932,591 | 4/1960 | Goodman | 117—93.31 X |
| 3,238,113 | 3/1966 | Bolt et al. | 204—159.11 X |
| 3,252,750 | 5/1966 | Heberlein et al. | 117—93.31 X |
| 3,309,221 | 3/1967 | Smith | 117—93.31 X |
| 3,310,424 | 3/1967 | Wehner et al. | 117—93.31 X |

FOREIGN PATENTS 801,479  9/1958  Great Britain.

ALFRED L. LEAVITT, Primary Examiner

J. H. NEWSOME, Assistant Examiner

U.S. Cl. X.R.

51—295; 117—100; 204—159.11